US008782438B2

(12) United States Patent
Kahn et al.

(10) Patent No.: US 8,782,438 B2
(45) Date of Patent: *Jul. 15, 2014

(54) SECURE STORAGE AND REPLAY OF MEDIA PROGRAMS USING A HARD-PAIRED RECEIVER AND STORAGE DEVICE

(75) Inventors: Raynold M. Kahn, Los Angeles, CA (US); Gregory J. Gagnon, Torrance, CA (US); David D. Ha, San Gabriel, CA (US); Peter M. Klauss, Torrance, CA (US); Christopher P. Curren, Brentwood, CA (US); Thomas H. James, Pacific Palisades, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/402,584

(22) Filed: Feb. 22, 2012

(65) Prior Publication Data

US 2012/0155837 A1 Jun. 21, 2012

Related U.S. Application Data

(63) Continuation of application No. 09/620,833, filed on Jul. 21, 2000, now Pat. No. 8,140,859.

(51) Int. Cl.
*G06F 12/14* (2006.01)

(52) U.S. Cl.
USPC ........... 713/193; 380/277; 380/278; 380/284; 726/32

(58) Field of Classification Search
CPC ............ G06F 21/10; G06F 2221/2107; H04L 29/06632; H04L 29/06659
USPC ........... 713/193, 200–201; 380/277–278, 284
See application file for complete search history.

(56) References Cited

U.S. PATENT DOCUMENTS 5,790,783 A * 8/1998 Lee et al. ................. 726/20
6,226,618 B1 * 5/2001 Downs et al. ............. 705/51
(Continued)

FOREIGN PATENT DOCUMENTS

| EP | 0936812 A1 | 8/1999 |
| WO | 00/56068 A1 | 9/2000 |
| WO | 0062505 A1 | 10/2000 |

OTHER PUBLICATIONS

EPO Communication dated Oct. 2, 2012 in European Patent Application No. 02789164.7 filed Sep. 20, 2002 by Raynold M. Kahn et al.

(Continued)

*Primary Examiner* — Farid Homayounmehr
*Assistant Examiner* — Lizbeth Torres-Diaz

(57) ABSTRACT

A method and apparatus for storing and retrieving program material for subsequent replay is disclosed. The method comprises the steps of receiving a data stream comprising the program material encrypted according to a first (CW) encryption key, decrypting the program material; re-encrypting the program material according to a second encryption key, and storing the re-encrypted material in a media storage device. The program material is played back by retrieving the re-encrypted material from the media storage device and decrypting the re-encrypted program material. In one embodiment, the media storage device also stores the second encryption key which has been further encrypted by a key that is unique to the device used to receive the program material.

22 Claims, 5 Drawing Sheets

(56) References Cited

U.S. PATENT DOCUMENTS

| | | |
|---|---|---|
| 6,286,008 B1 | 9/2001 | Matsumoto et al. |
| 6,381,747 B1 | 4/2002 | Wonfor et al. |
| 6,466,671 B1 * | 10/2002 | Maillard et al. ............. 380/227 |
| 6,574,609 B1 * | 6/2003 | Downs et al. .................... 705/50 |
| 6,889,208 B1 * | 5/2005 | Okabe et al. ..................... 705/57 |
| 6,912,513 B1 | 6/2005 | Candelore |
| 7,239,709 B1 * | 7/2007 | Yamada et al. ............... 380/281 |
| 7,395,545 B2 | 7/2008 | Wonfor et al. |
| 7,409,562 B2 | 8/2008 | Kahn et al. |
| 7,548,624 B2 | 6/2009 | Kahn et al. |
| 7,580,523 B2 | 8/2009 | Kahn et al. |
| 7,599,494 B2 | 10/2009 | Kahn et al. |
| 7,797,552 B2 | 9/2010 | Kahn et al. |
| 7,801,303 B2 | 9/2010 | Dulac |
| 7,992,175 B2 | 8/2011 | Klauss et al. |
| 8,001,565 B2 | 8/2011 | Kahn et al. |
| 8,050,406 B2 | 11/2011 | Pedlow, Jr. |
| 8,082,572 B1 | 12/2011 | Tilford |
| 8,095,466 B2 | 1/2012 | Kahn et al. |
| 8,140,859 B1 * | 3/2012 | Kahn et al. .................... 713/193 |
| 8,165,302 B2 | 4/2012 | Pedlow, Jr. |
| 8,243,925 B2 | 8/2012 | Cocchi et al. |
| 8,250,597 B2 | 8/2012 | Wonfor et al. |
| 2005/0089162 A1 | 4/2005 | Kobayashi |
| 2005/0246372 A1 | 11/2005 | Yamaki |
| 2006/0288426 A1 * | 12/2006 | Saito ............................... 726/26 |
| 2007/0036516 A1 | 2/2007 | Kahn et al. |
| 2007/0118770 A1 | 5/2007 | Kahn et al. |
| 2007/0265966 A1 | 11/2007 | Kahn et al. |
| 2007/0265967 A1 | 11/2007 | Kahn et al. |
| 2007/0265973 A1 | 11/2007 | Kahn |
| 2007/0265978 A1 | 11/2007 | Kahn et al. |
| 2008/0033881 A1 | 2/2008 | Ficco |
| 2008/0034276 A1 | 2/2008 | Ficco |
| 2010/0180291 A1 | 7/2010 | Kahn et al. |
| 2012/0275599 A1 | 11/2012 | Cocchi et al. |

OTHER PUBLICATIONS

Non-final Office action dated Feb. 8, 2013 in U.S. Appl. No. 12/172,901, filed Jul. 14, 2008 by Raynold M. Kahn et al.

Ex Parte Quayle action dated Aug. 8, 2013 in U.S. Appl. No. 12/172,901, filed Jul. 14, 2008 by Raynold M. Kahn et al.

* cited by examiner

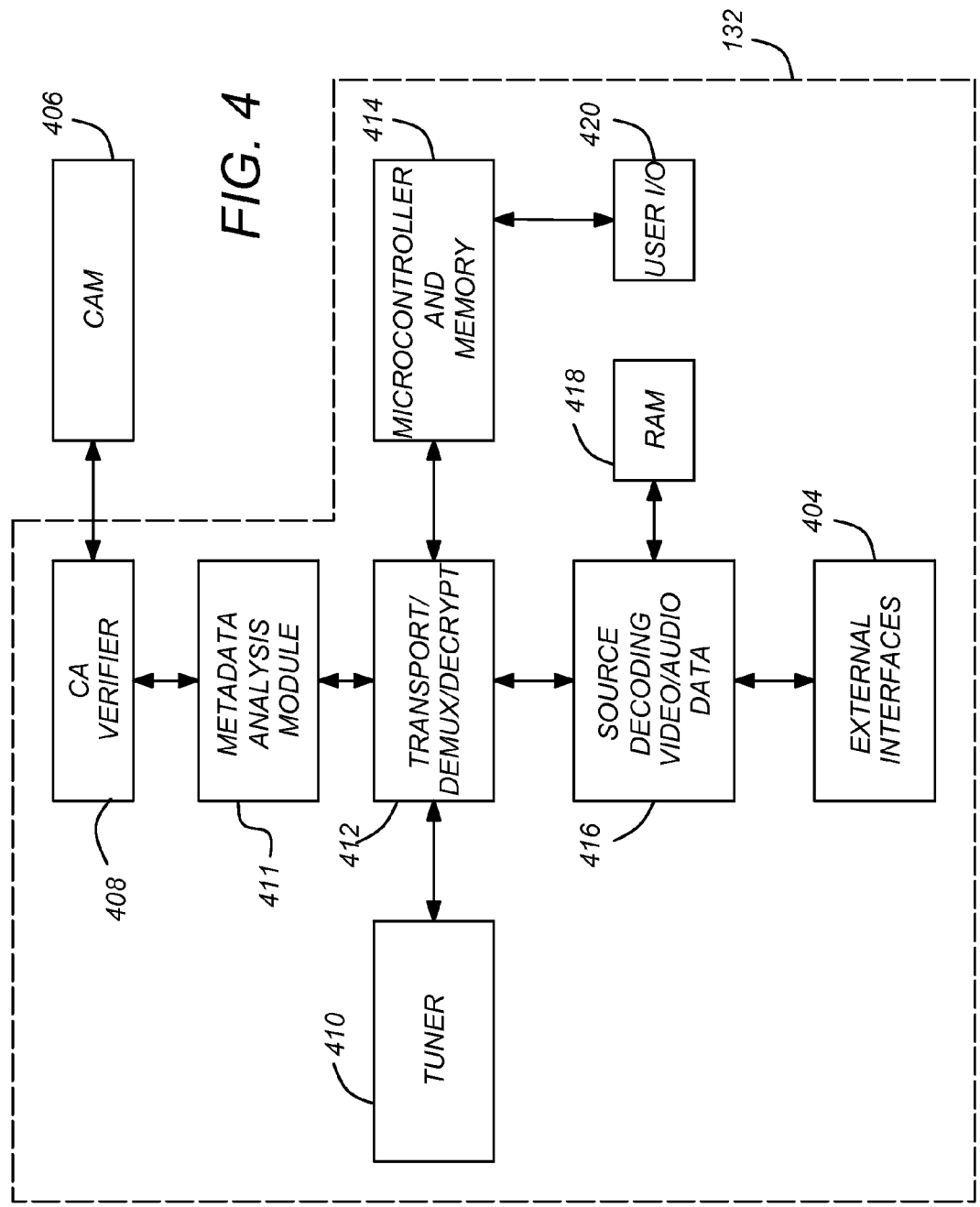

SECURE STORAGE AND REPLAY OF MEDIA PROGRAMS USING A HARD-PAIRED RECEIVER AND STORAGE DEVICE

CROSS-REFERENCE TO RELATED APPLICATIONS

This application is a continuation of U.S. patent application Ser. No. 09/620,833, entitled "SECURE STORAGE AND REPLAY OF MEDIA PROGRAMS USING A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed Jul. 21, 2000, which application is hereby incorporated by reference herein.

This application is related to the following patent applications, all of which applications are hereby incorporated by reference herein:

U.S. patent application Ser. No. 11/701,800, entitled "SUPER ENCRYPTED STORAGE AND RETRIEVAL OF MEDIA PROGRAMS IN A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed Feb. 2, 2007, issued Jan. 20, 2009 as U.S. Pat. No. 7,480,381, which is a continuation of U.S. patent application Ser. No. 09/621,476, entitled "SUPER ENCRYPTED STORAGE AND RETRIEVAL OF MEDIA PROGRAMS IN A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed Jul. 21, 2000 and issued Apr. 10, 2007 as U.S. Pat. No. 7,203,311;

U.S. patent application Ser. No. 09/620,773, entitled "SUPER ENCRYPTED STORAGE AND RETRIEVAL OF MEDIA PROGRAMS WITH MODIFIED CONDITIONAL ACCESS FUNCTIONALITY," by Raynold M. Kahn, Gregory J. Gagnon, David D. Ha, Peter M. Klauss, Christopher P. Curren, and Thomas H. James, filed Jul. 21, 2000 and issued Apr. 10, 2007 as U.S. Pat. No. 7,203,314;

U.S. patent application Ser. No. 12/184,957, entitled "SUPER ENCRYPTED STORAGE AND RETRIEVAL OF MEDIA PROGRAMS WITH SMARTCARD GENERATED KEYS," by Raynold M. Kahn, Gregory J. Gagnon, David D. Ha, Peter M. Klauss, Christopher P. Curren, and Thomas H. James, filed Aug. 1, 2008 and issued Sep. 28, 2010 as U.S. Pat. No. 7,804,958, which is a continuation of U.S. patent application Ser. No. 09/620,772, entitled "SUPER ENCRYPTED STORAGE AND RETRIEVAL OF MEDIA PROGRAMS WITH SMARTCARD GENERATED KEYS," by Raynold M. Kahn, Gregory J. Gagnon, David D. Ha, Peter M. Klauss, Christopher P. Curren, and Thomas H. James, filed Jul. 21, 2000 and issued Nov. 25, 2008 as U.S. Pat. No. 7,457,414;

U.S. patent application Ser. No. 09/620,832, entitled "VIDEO ON DEMAND PAY PER VIEW SERVICES WITH UNMODIFIED CONDITIONAL ACCESS FUNCTIONALITY" by Raynold M. Kahn, Gregory J. Gagnon, David D. Ha, Peter M. Klauss, Christopher P. Curren, and Thomas H. James, filed Jul. 21, 2000, and issued Feb. 8, 2005 as U.S. Pat. No. 6,853,728; and U.S. patent application Ser. No. 13/053,075, entitled "VIRTUAL VIDEO ON DEMAND USING MULTIPLE ENCRYPTED VIDEO SEGMENTS," by Robert G. Arsenault and Leon J. Stanger, filed on Mar. 21, 2011, which is a continuation of U.S. patent application Ser. No. 10/759,679, entitled "VIRTUAL VIDEO ON DEMAND USING MULTIPLE ENCRYPTED VIDEO SEGMENTS," by Robert G. Arsenault and Leon J. Stanger, filed on Jan. 19, 2004, and issued Apr. 12, 2011 as U.S. Pat. No. 7,926,078, which is a continuation of U.S. patent application Ser. No. 09/491,959, entitled "VIRTUAL VIDEO ON DEMAND USING MULTIPLE ENCRYPTED VIDEO SEGMENTS," by Robert G. Arsenault and Leon J. Stanger, filed on Jan. 26, 2000, and now issued Mar. 2, 2004 as U.S. Pat. No. 6,701,528.

BACKGROUND OF THE INVENTION

1. Field of the Invention

The present invention relates to systems and methods for providing video program material to subscribers, and in particular to a method and system for securely storing and replaying media programs.

2. Description of the Related Art

In recent years, there has been increasing interest in allowing cable and satellite television subscribers to record broadcast media programs for later viewing. This capability, hereinafter referred to as personal video recording (PVR), can be used to provide video-on-demand (VOD) services, or simply to allow the subscriber to save media programs for repeated viewing and/or archival purposes.

In the past, video cassette tape recorders (VCRs) have been used for such personal video recording. Recently, however, hard disks, similar to those used in personal computers, have been used to store media programs for later viewing. Unlike VCRs, such devices typically do not include a tuner, and are instead coupled to the satellite receiver or cable box. Also unlike VCRs, these devices are typically used to record digital content, not analog video. This difference is both advantageous and disadvantageous.

An advantage of such devices is that they permit long term storage and multiple replays without substantial degradation. Another advantage is that they permit more rapid trick-play functions such as fast forwarding and rewinding. A disadvantage of such devices is that they are capable of making multiple-generation copies of the program material as well, and without serious degradation. This raises the very real possibility that the multiple generation copies of the media programs will be produced and distributed without permission. This possibility has caused some media providers to be reluctant to allow their media programs to be recorded by such devices.

To ameliorate this problem, it is critical to protect the stored media programs with strong security and copy control. Current devices, do not scramble media programs before storage, nor do they store copy protection information. Instead, such devices record decrypted program content into the storage disk using a paired hardware scheme in which the hard disk controller and hard disk are paired to each other specifically through a specific interface. Because the hard disk controller and the disk itself are essentially paired together, storage or playback will not function if the disk were to be removed and transferred to another player. The weakness of this security scheme is that it relies only on the paired hardware to ensure security . . . the media programs stored on the disk drive itself are not encrypted.

While it would presumably be possible to simply store the datastream as it is received from the broadcaster for later replay, this technique has distinct disadvantages. One such disadvantage is that it would provide pirates a permanently recorded version of the encrypted datastream, thus providing the pirate with information that can be used to perform detailed analyses of the datastream itself to determine the encryption techniques and codes.

What is needed is a system and method for securely recording broadcast media programs (including impulse purchase pay-per-view programs) for limited use playback at a later time. Such a system could be used to support video-on-demand (VOD), thus allowing the subscriber to purchase media programs and games from the set top box instantly without worrying about the start time of the program. What is also needed is a system and method that does not require substantial changes to subscriber hardware, such as the integrated receiver/decoder (IRD), or the conditional access module (CAM) that is used to provide a key to decrypt the media programs for presentation to the subscribers.

SUMMARY OF THE INVENTION

In summary, the present invention describes a system and method for storing and retrieving program material for subsequent replay. The method comprises the steps of receiving a data stream comprising the program material encrypted according to a first encryption key, decrypting the program material; re-encrypting the program material according to a second encryption key; and storing the re-encrypted material in a media storage device. The program material is played back by retrieving the re-encrypted material from the media storage device and decrypting the re-encrypted program material. In one embodiment, the second encryption key is derived from metadata describing replay rights. In a further embodiment, the media storage device also stores the second encryption key which has been further encrypted by a key that is unique to the device used to receive the program material.

The apparatus comprises a tuner, for receiving a data stream comprising encrypted access control information and the program material encrypted according to a first encryption key, the access control information including a first encryption key; a conditional access module, for decrypting the encrypted access control information to produce a first encryption key; a first decryption module, for decrypting the program material using the first encryption key; an encryption module, for re-encrypting the decrypted program material according to a second encryption key and for encrypting the second encryption key according to a third encryption key to produce a fourth encryption key; and a second decryption module, for decrypting the fourth encryption key to produce the second encryption key using the third encryption key and for decrypting the re-encrypted program material using the second encryption key.

One object of the present invention is to provide a system allowing for growth to pay-per-play or true video-on-demand (VOD) services from media programs stored on a hard disk. The pay-per-play service allows the subscriber to select media programs or games from the real time broadcast data or from the media programs stored on the disk. VOD service permits the subscriber to purchase provided media programs and games from the subscriber's receiver instantly, without regard to the start time of the program.

Another object of the present invention is to provide for the reception and decryption of broadcast media programs, including impulse pay-per-view (IPPV) programs, that can be played and recorded onto storage media and allows playback at a later time with limited use. The data itself may be placed in short term storage, but the replay of the media programs can be accomplished with trick play functions such as forward, reverse, fast forward, fast reverse, frame advance, and pause functions.

Another object of the present invention is to provide PVR functions which provide recording, delayed playback, and trick play of IPPV media programs from the storage media without requiring a pre-purchase of the IPPV media program. This would allow the IPPV media program to be viewed without requiring the IPPV media program to be purchased prior to storage. Ideally, such a system would allow the user to select the IPPV media program from the storage device, subject to limited play rights.

Still another object of the present invention is to provide a pairing between the storage media and elements of the subscriber's IRD to assure that playback of the media programs from the storage device are permitted only with the proper IRD.

Still another object of the present invention is to provide a secure means for storing broadcast data streams (including IPPV and games) on a data storage device, while providing for adequate copy protection.

Still another object of the present invention is to provide a system and method for handling the archiving and retrieving of media programs and other data, even if the data storage device fails.

Still another object of the present invention is to provide a system and method that allows media program purchases to be recorded in a way that is analogous to that which is employed for real-time off-the-air programs.

Still another object of the present invention is to provide a system that provides a growth path to a system permitting IPPV media programs to be previewed without charge for an initial period of time with the option to purchase the media program or cancel the purchase, regardless of whether the program is retrieved from the storage device or obtained from a real time broadcast.

The present invention eliminates concerns regarding the proliferation of unauthorized digital copies of the media programs by use of a strong encryption method. Further, the present invention ensures that the stored material cannot be distributed since such decryption of the material can only be successfully performed by the encrypting IRD. At the same time, the present invention can be implemented with minimal changes to the IRD, and no changes to the CAM interface. The present invention also provides a basis for a growth path to more advanced encryption/decryption techniques.

BRIEF DESCRIPTION OF THE DRAWINGS

Referring now to the drawings in which like reference numbers represent corresponding parts throughout:

FIG. 4 is a block diagram illustrating a high-level block diagram of the IRD.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
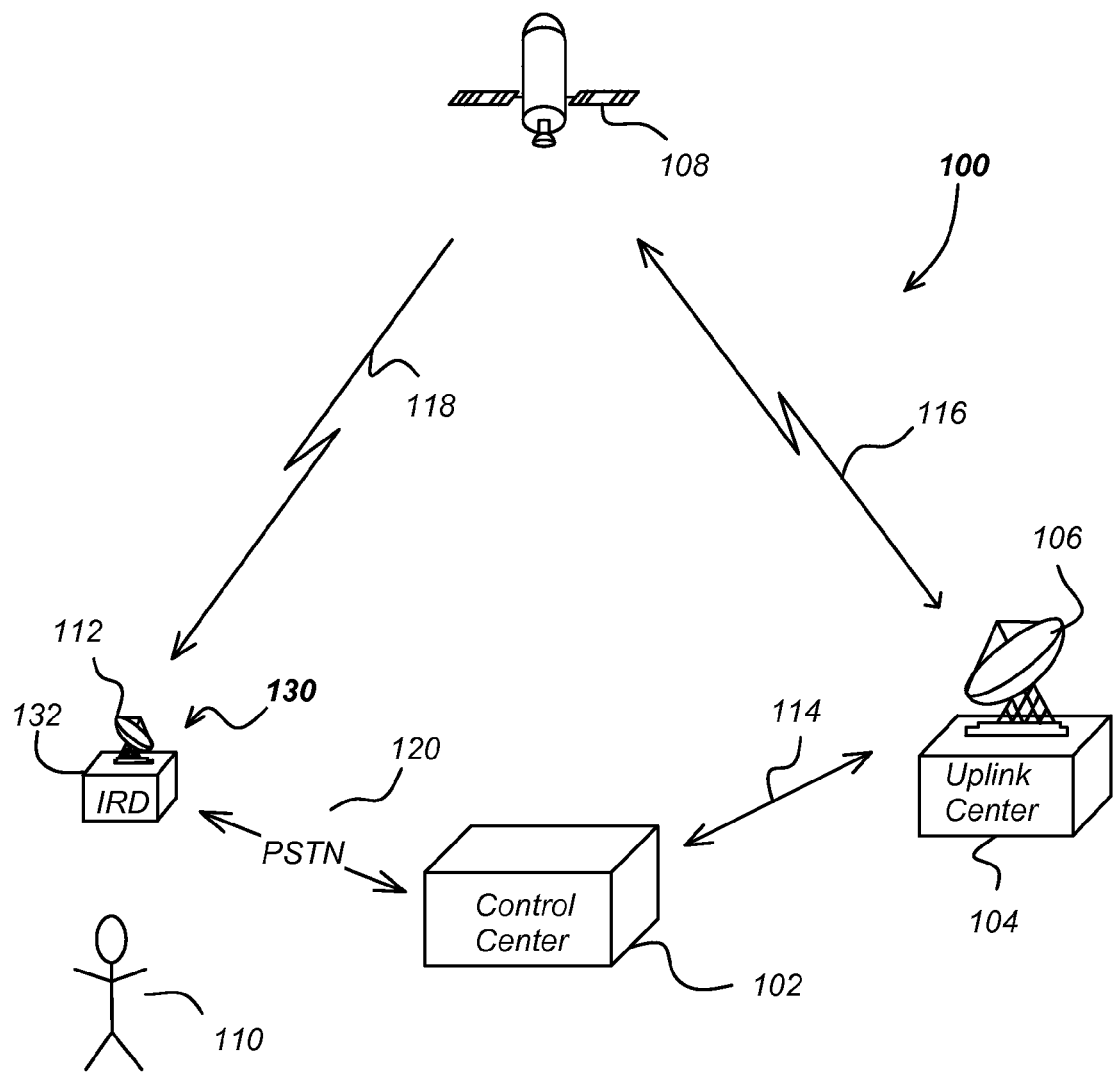
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground or other link 114 and an integrated receiver/decoder (IRD) 132 at receiver station 130 via a public switched telephone network (PSTN) or other link 120. The control center 102 provides program material to the uplink center 104, coordinates with the receiver station 130 to offer subscribers 110 pay-per-view (PPV) program services, including billing and associated decryption of video programs.

The uplink center 104 receives program material and program control information from the control center 102, and using an uplink antenna 106, transmits the program material and program control information to the satellite 108. The satellite 108 receives and processes this information, and transmits the video programs and control information to the IRD 132 at the receiver station 130 via downlink 118. The IRD 132 receives this information using a communicatively coupled subscriber antenna 112.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by traditional broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information or data as well.

Figure 2:
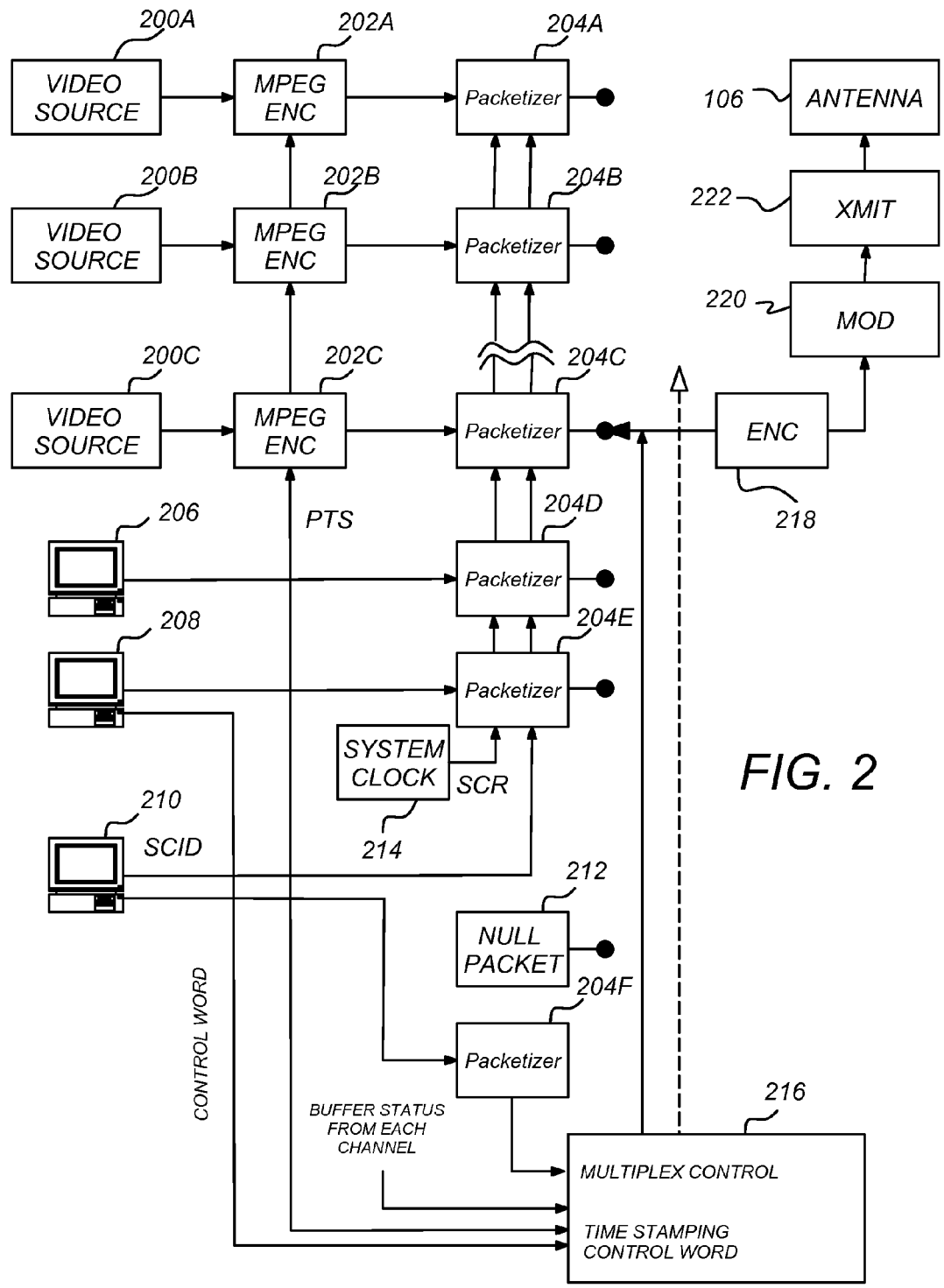
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a computer data source 206.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a presentation time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200, 206-210.

The data packets are assembled using a reference from the system clock 214 (SCR), a control word (CW) generated by the conditional access manager 208, and a system channel identifier (SCID) generator 210 that associates each of the data packets that are broadcast to the subscriber with a program channel. This information is transmitted to the packetizers 204 for use in generating the data packets. These data packets are then multiplexed into serial data, encoded, modulated, and transmitted. A special packet known as a control word packet (CWP) which comprises control data including the control word (CW) and other control data used in support of providing conditional access to the program material is also encrypted and transmitted.

Figure 3A:
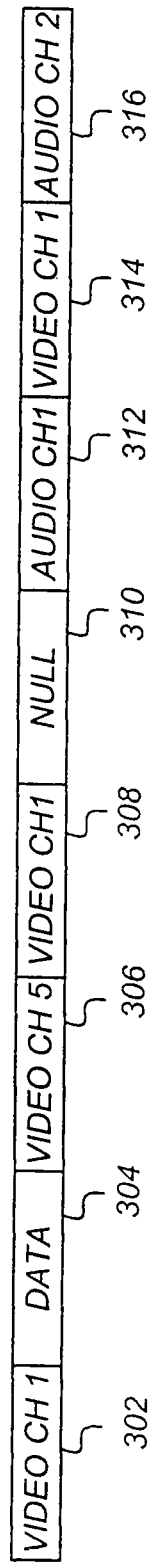
FIG. 3A is a diagram of a representative data stream received from a satellite.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment includes information from video channel 1 (again, coming from the first video program source 200A). The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscribers 110 receive media programs via a subscriber receiver or IRD 132. Using the SCID, the IRD 132 reassembles the packets to regenerate the program material for each of the channels. As shown in FIG. 3A, null packets created by the null packet module 312 may be inserted into the data stream as desired.

Figure 3B:
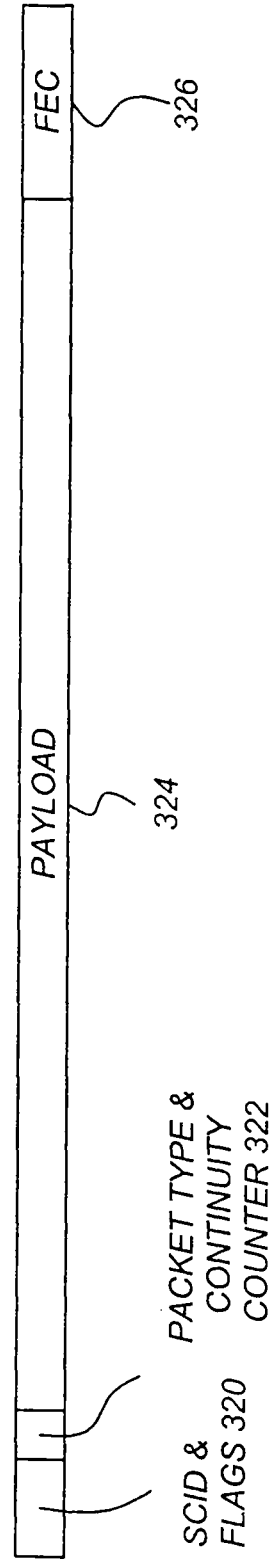
FIG. 3B is a diagram illustrating the structure of a data packet.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 200. The final packet segment 326 is data required to perform forward error correction.

Encryption of Media Programs

Media programs are encrypted by the encryption module 218 before transmission to assure that they are received and viewed only by authorized subscribers. Each media program is encrypted according to an alphanumeric encryption key referred to hereinafter as a control word (CW). This can be accomplished by a variety of data encryption techniques, including symmetric algorithms such as the data encryption standard (DES) and the asymmetric algorithms such as the Rivest-Shamir-Adleman (RSA) algorithm.

To decrypt the media programs, the subscriber's 110 IRD 132 must also have access to the CW. To maintain security, CWs are not transmitted to the IRD 132 plaintext. Instead, CWs are encrypted before transmission to the subscriber's IRD 132. The encrypted CW is transmitted to the subscriber's IRD 132 in a control word (data) packet.

In one embodiment, the data in the CWP, including the CW, is encrypted and decrypted via what is referred to hereinafter as an input/output (I/O) indecipherable algorithm.

An I/O indecipherable algorithm is an algorithm that is applied to an input data stream to produce an output data stream. Although the input data stream uniquely determines the output data stream, the algorithm selected is such that it's characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD 132 share the same I/O indecipherable algorithm, the IRD 132 can decode the information in the CWP to retrieve the CW. Then, using the CW, the IRD 132 can decrypt the media program so that it can be presented to the subscriber 110.

To further discourage piracy, the control data needed to decrypt and assemble data packets into viewable media programs may be time-varying (the validity of the control data in a CWP to decode a particular media program changes with time). This can be implemented in a variety of ways.

For example, since each CWP is associated with a SCID for each media program, the SCID related to each CWP could change over time.

Another way to implement time-varying control data is to associate time stamps with the received data stream and the CWP control data. In this case, successful decoding of the CWP to produce the CW would require the proper relationship between the time stamps for the data stream and the control data in the CWP. This relationship can be defined, for example, by changing the decryption scheme used to generate the CW from the CWP according to the received time stamp for the data stream. In this case, if the time stamp of the received data stream does not match the expected value, the wrong decryption scheme will be selected and the proper CW (to decrypt the program material) will not be produced. If, however, the time stamp of the received data stream matches the expected value, the proper decryption scheme will be selected, and the CWP decryption scheme will yield the proper CW.

Requesting Pay-Per-View Services

The data required to receive pay-per-view (PPV) media programs are stored in the CWP and in another data packet known as the purchase information parcel (PIP). Both the CWP and the PIP are broadcast to the subscriber via the video distribution system 100 in real time. As described below, the CWP is used by the IRD 132 to retrieve PPV media programs.

Generally, PPV services can include operator-assisted pay-per-view (OPPV) and impulse pay-per-view (IPPV) services. When requesting OPPV services, the subscriber 110 must decide in advance that they desire access to a particular media program. The subscriber 110 then calls an entity such as the control center 102, and requests access to the media program. When requesting impulse pay-per-view services (IPPV), the subscriber 110, while viewing the program guide, moves the cursor over the viewer channel associated with the desired media program, and selects "enter." After the decision and rights to purchase a PPV program are confirmed (for example, by checking channel lockouts, rating limits, and purchase limits), a purchase information parcel (PIP) is received and stored in the subscriber's conditional access module 406 (which is described in more detail below) for further use. The conditional access module 406 associates the information in the CWP and the PIP, and uses the PIP in conjunction with the CWP to verify that the subscriber 110 should be provided access to the media program and to decrypt the media program.

Ordering PPV media programs in advance using the PIP is limited, however, since the PIP is broadcast up to 24 hours before the media program itself is broadcast. Since the PIP is broadcast in real time, the IRD 132 does not acquire the PIP until the subscriber 110 actually requests the PPV media program purchase.

Subscriber Reception and Decryption of Media Programs

FIG. 4 is a simplified block diagram of an IRD 132. The IRD 132 receives and decrypts the media programs broadcast by the video distribution system 100. These media programs are streamed to the IRD 132 in real time, and may include, for example, video, audio, or data services.

The IRD 132 is communicatively coupleable to a conditional access module (CAM) 406. The CAM 406 is typically implemented in a smart card or similar device, which is provided to the subscriber 110 to be inserted into the IRD 132. The CAM 406 interfaces with a conditional access verifier (CAV) 408 which performs at least some of the functions necessary to verify that the subscriber 110 is entitled to access the media programs. The CAV 408 is communicatively coupled to a metadata analysis module (MAM) 411. Using the information in metadata table (e.g. Table 1 described below), the MAM 411 acts as a gate-keeper to determine whether stored media programs will be decrypted and presented to the subscriber 110. This is accomplished by comparing the metadata values with measured or accumulated values. The CAV 408 and the MAM 411 can be implemented as separate modules from the transport/demux/decryptor 412 and the microcontroller and memory 414 as shown, or may be implemented via software instructions stored in the memory and performed by the microcontroller 414.

The IRD 132 comprises a tuner 410, a transport and demultiplexing module (TDM) 412, which operates under control of a microcontroller and associated memory 414, a source decoder 416 and communicatively coupled random access memory (RAM) 418, and a user I/O device for accepting subscriber 110 commands and for providing output information to the subscriber.

The tuner 410 receives the data packets from the video distribution system and provides the packets to the TDM 412. Using the SCIDs associated with each media program, the TDM 412 reassembles the data packets according to the channel selected by the subscriber 110, and unencrypts the media programs using the CW key. The TDM 412 can be implemented by a single secure chip, and is communicatively coupled to a microcontroller and memory 414.

Once the media programs are unencrypted, they are provided to the source decoder 416 which decodes the media program data according to MPEG or JPEG standards as appropriate. The decoded media program is then provided to a D/A converter (if necessary) and provided to external interfaces 404 which can include a media program presentation device such as a television, an audio system, or a computer. The source decoder 416 makes use of communicatively coupled RAM 418 to perform these functions.

The CW key is obtained from the CWP using the CAV 408 and the CAM 406. The TDM 412 provides the CWP to the CAM 406 via the CAV 408. The CAM 406 uses the I/O indecipherable algorithm to generate the CW, which is provided back to the TDM 412. The TDM 412 uses the CW to decrypt the media programs. In most IRDs 132, the CAV 408 and the CAM 406 are capable of decrypting one video/audio/data media program at a time.

As described above, to discourage potential pirates, the control data in the CWP used to decode a particular media program may change with time so that it only produces the proper CW when applied to a media program having the proper time stamp. In this case, the CAM 406 can select and/or control the decryption scheme (e.g. the I/O indecipherable algorithm) according to the time stamp associated with the data stream carrying the media program. If the media program is sufficiently disassociated in time, the improper decryption scheme will be used, and the proper CW to decode the media program will not be produced.

Further details regarding the encryption and decryption of media programs can be found in co-pending and commonly assigned U.S. patent application Ser. No. 09/491,959.

Storage and Retrieval of Media Programs in Encrypted Form

Figure 5:
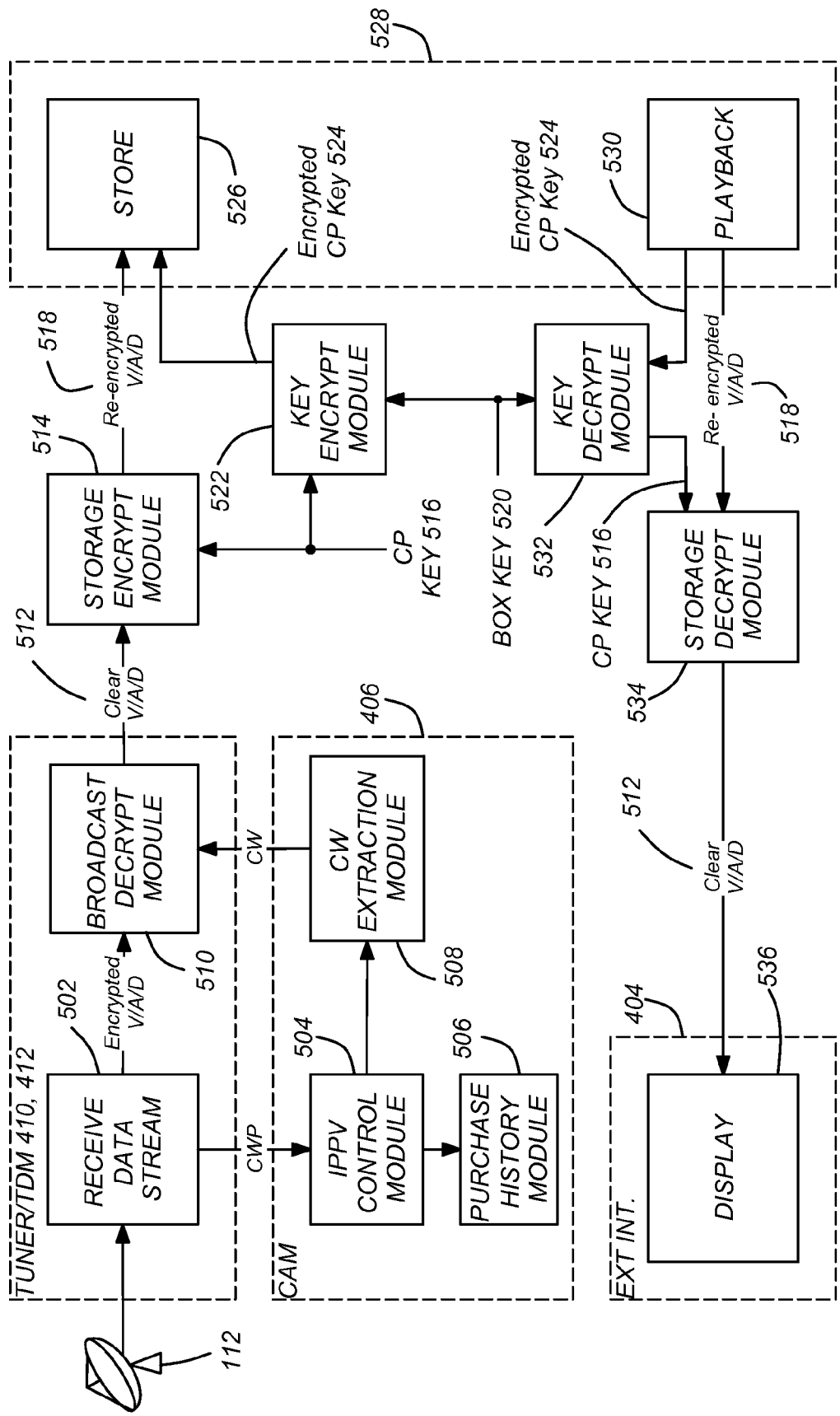
FIG. 5 is a diagram illustrating the storage and retrieval of data from a media storage device.

FIG. 5 is a diagram presenting exemplary method steps used to practice one embodiment of the present invention. A data stream is provided by subscriber antenna 112 and received by the tuner 410 and the TDM 412, as shown in block 502. The data stream includes a plurality of data packets which include the CWP, and program material that is encrypted according to a first (CW) encryption key. The data stream may also include metadata having replay rights. The replay rights are parameters necessary for controlling the replay of IPPV or pay-per-play services.

When the subscriber elects to purchase the media program, a viewing request is provided, and an IPPV control module 504 CAM 406 controls whether access to the requested media program will be provided. If so, the purchase history module 506 collects information required to send a bill for the media program to the subscriber 110. After the purchase history module 506 has acquired and recorded the required information, the IPPV control module 504 commands the CW extraction module 508 to decrypt the CWP to obtain the first (CW) encryption key. In one embodiment, this is performed using a complementary form of the I/O indecipherable algorithm that was used to encrypt the CW and other information to form the CWP. The resulting CW encryption key is provided to a broadcast decrypt module 510. The broadcast decrypt module 510 uses the CW key to decrypt the media program (hereinafter alternatively referred to as program material) to produce a clear (non-encrypted) version of the media program 512. The resulting clear media program 512 is applied to a storage encryption module 514, where the media program is re-encrypted according to a second copy protection (CP) encryption key 516. This is illustrated in box 514. In one embodiment, the CP key 516 is used to encrypt and decrypt the media program via an encryption technique such as RSA, or preferably, triple 56-bit DES, DES-X cipher block chaining (CBC). DES is preferred because it is computationally more efficient than RSA in performing time-related computations. In one embodiment, the CP key 516 is a key that is unique to each IRD 132 and is stored therein.

The CP key 516 itself is then provided to a key encryption module 522, where it is encrypted with a third (box) encryption key 520 to produce a fourth encryption key (illustrated in FIG. 5 as Encrypted CP key 524). The box encryption key 520 is unique to each IRD 132, and is typically hardcoded in the IRD 132.

The re-encrypted program material 518 and the Encrypted CP key 524 is then stored in the media storage device 528 as shown in block 526. The media storage device 528 could include a hard disk drive, similar to that which is employed in personal computers, a optical-magnetic hard disk drive, an optical disk drive, or any other medium by which data may be recorded for subsequent playback.

When the subscriber 110 decides to view the recorded program material, a command is provided to the IRD 132 via the user I/O interface 420. The re-encrypted program material and the encrypted CP key 524 stored in the media storage device 528 are then retrieved, as shown in block 530. The encrypted CP key 524 is then provided to decryption module 532, where it is decrypted with the box key 520 to produce the CP key 516.

The CP encryption key 516 is then provided to the storage decryption module 534, where the program material is decrypted according to the CP key 516. The decrypted (and now clear) program material is now provided to a display 536 or other presentation device.

In one embodiment, the CP key 516 is modified with (e.g. by appending or adding) some or all of the metadata received in the broadcast data stream before being encrypted according to the box key 520. In this case, the encrypted CP key 524 not only includes the value of the CP key 516, but also, the metadata as well. When the encrypted CP key 524 is thereafter retrieved from the storage media 528 and de-encrypted with the box key 520, the CP key 516 and the metadata is recovered as well. This metadata can be compared to other data (e.g. the data and the time of day) to enforce the replay rights as required.

The CP key 516 can be stored in a transport chip within the TDM 412. This allows the present invention to be used with an unmodified CAM 406. This also permits rapid encryption and decryption of information stored in the media storage device 528, which is particularly advantageous where trick play functions are desired.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. For example, the encryption functions described herein could be performed by separate encryption/decryption modules, or a single multi-purpose encryption/decryption module can be utilized to perform the encryption/decryption functions of many separate modules.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of storing program material for subsequent replay, comprising the steps of:
   receiving, in a device, a data stream comprising program material encrypted according to a first encryption key for the program material;
   decrypting, in the device, the program material;
   re-encrypting, in the device, the decrypted program material according to a second encryption key derived at least in part from metadata describing media program replay rights;
   encrypting, in the device, the second encryption key according to a third encryption key to produce a fourth encryption key; and
   storing the re-encrypted program material in a media storage device.

2. The method of claim 1, further comprising the steps of:
   retrieving, in the device, the stored re-encrypted program material; and
   decrypting, in the device, the retrieved re-encrypted program material.

3. The method of claim 2, wherein the step of decrypting the retrieved re-encrypted program material comprises the steps of:
   reading, in the device, the fourth encryption key;
   decrypting, in the device, the fourth encryption key with the third encryption key to produce the second encryption key; and
   decrypting, in the device, the re-encrypted program material using the second encryption key.

4. The method of claim 3, further comprising the steps of:
   accepting, in the device, a viewing request before reading the fourth encryption key; and
   recording, in the device, billing information regarding the program material.

5. The method of claim 1, wherein the second encryption key is derived at least in part from a broadcast time of the program material.

6. A method of storing program material for subsequent replay, comprising the steps of:
   receiving, in a device, a data stream comprising program material encrypted according to a first encryption key for the program material;
   decrypting, in the device, the program material;
   re-encrypting, in the device, the decrypted program material according to a second encryption key wherein the second encryption key is derived at least in part from the metadata;
   encrypting, in the device, the second encryption key and metadata describing media program replay rights according to a third encryption key to produce a fourth encryption key; and
   storing the re-encrypted program material in a media storage device.

7. The method of claim 6, further comprising the steps of:
   retrieving, in the device, the stored re-encrypted program material; and
   decrypting, in the device, the retrieved re-encrypted program material.

8. The method of claim 7, further comprising the step of storing the fourth encryption key.

9. The method of claim 8, wherein the step of decrypting the retrieved re-encrypted program material comprises the steps of:
   reading, in the device, the stored fourth encryption key;
   decrypting, in the device, the fourth encryption key with the third encryption key to produce the second encryption key and the metadata; and
   decrypting the re-encrypted program material using the second encryption key according to a comparison between the decrypted metadata and other data.

10. The method of claim 9, further comprising the steps of:
    accepting, in the device, a viewing request before reading the fourth encryption key; and
    recording, in the device, billing information regarding the program material.

11. The method of claim 6, wherein the second encryption key is derived at least in part from a broadcast time of the program material.

12. The method of claim 6, wherein the step of encrypting the second encryption key and the metadata according to the third encryption key to produce the fourth encryption key comprises the step of:
    modifying the second encryption key with the metadata; and
    encrypting, in the device, the modified second encryption key according to the third encryption key to produce the fourth encryption key.

13. A receiver for storing program material for subsequent replay, comprising:
    a tuner, for receiving a data stream comprising encrypted access control information, the program material encrypted according to a first encryption key, wherein the access control information includes the first encryption key;
    a conditional access module, communicatively coupleable to the tuner, for decrypting the encrypted access control information to produce the first encryption key;
    a first decryption module, communicatively coupled to the tuner and communicatively coupleable to the conditional access module, for decrypting the program material using the first encryption key;
    an encryption module, communicatively coupled to the first decryption module and communicatively coupleable to a media storage device, for re-encrypting the decrypted program material according to a second encryption key derived at least in part from metadata describing replay rights and for encrypting the second encryption key according to a third encryption key to produce a fourth encryption key; and
    a second decryption module, communicatively coupleable to the media storage device, for decrypting the fourth encryption key to produce the second encryption key using the third encryption key, and for decrypting the re-encrypted program material using the second encryption key.

14. The receiver of claim 13, further comprising:
a media storage device, for storing and retrieving the re-encrypted program material and the fourth encryption key.

15. The receiver of claim 13, further comprising:
a user I/O device for accepting a viewing request for the program material; and
a purchase history module, for accepting and storing billing information regarding the viewing request for the program material.

16. The receiver of claim 13, wherein the second encryption key and the third encryption key are receiver-unique.

17. The receiver of claim 13, wherein the first decryption module and the first encryption module are implemented in a single chip device.

18. The receiver of claim 13, wherein the program material is decrypted in a chip according to a control word received from a conditional access module inserted into the receiver, and the second encryption key is stored in the chip.

19. The receiver of claim 18, wherein the chip is a transport chip.

20. The method of claim 1, wherein the step of storing the re-encrypted program material in the media storage device comprises the step of storing the re-encrypted program material and the fourth encryption key in the media storage device.

21. The method of claim 8, wherein the fourth encryption key is stored in the media storage device.

22. The receiver of claim 13, wherein the encryption module encrypts the second key and the metadata to produce the fourth key.

* * * * *